(12) United States Patent
Wobben

(10) Patent No.: US 8,552,576 B2
(45) Date of Patent: *Oct. 8, 2013

(54) WIND TURBINE COMPRISING A GENERATOR COOLING SYSTEM

(76) Inventor: Aloys Wobben, Aurich (DE)

( * ) Notice: Subject to any disclaimer, the term of this patent is extended or adjusted under 35 U.S.C. 154(b) by 60 days.

This patent is subject to a terminal disclaimer.

(21) Appl. No.: 13/243,327

(22) Filed: Sep. 23, 2011

(65) Prior Publication Data

US 2012/0032449 A1 Feb. 9, 2012

Related U.S. Application Data

(63) Continuation of application No. 11/662,961, filed as application No. PCT/EP2005/010304 on Sep. 23, 2005, now Pat. No. 8,053,918.

(30) Foreign Application Priority Data

Sep. 24, 2004 (DE) .......................... 10 2004 046 700

(51) Int. Cl.
*F03D 9/00* (2006.01)
*H02P 9/04* (2006.01)

(52) U.S. Cl.
USPC .......................................................... 290/44

(58) Field of Classification Search
USPC ......... 290/44, 55; 416/1, 132 B; 415/2.1, 4.2, 415/4.4, 4.5, 905, 906, 907, 908, 4.3
See application file for complete search history.

(56) References Cited

U.S. PATENT DOCUMENTS

| | | | |
|---|---|---|---|
| 3,684,906 A | 8/1972 | Lenz | |
| 3,916,231 A | 10/1975 | Cathey | |
| 5,557,153 A | 9/1996 | Zimmermann | |
| 6,278,197 B1 | 8/2001 | Appa | |
| 6,676,122 B1 * | 1/2004 | Wobben | 290/55 |
| 6,759,758 B2 * | 7/2004 | Torres Martinez | 290/55 |
| 6,903,466 B1 * | 6/2005 | Mercier et al. | 290/44 |
| 6,921,243 B2 | 7/2005 | Canini et al. | |
| 7,427,814 B2 | 9/2008 | Bagepalli et al. | |
| 7,637,715 B2 * | 12/2009 | Battisti | 415/115 |
| 8,053,918 B2 * | 11/2011 | Wobben | 290/55 |
| 2004/0041408 A1 * | 3/2004 | Casazza | 290/55 |

FOREIGN PATENT DOCUMENTS

| | | |
|---|---|---|
| DE | 243208 C | 1/1911 |
| DE | 4437438 A1 | 11/1995 |
| DE | 4431361 A1 | 3/1996 |

(Continued)

OTHER PUBLICATIONS

"Erneuerbare Engergien", Abschlussbericht der Technischen Versicherer im GDV, Mar. 2003.

*Primary Examiner* — Julio R Gonzalez
(74) *Attorney, Agent, or Firm* — Seed IP Law Group PLLC

(57) ABSTRACT

A wind power installation is provided having a pylon, a pod mounted rotatably on the pylon, a generator arranged within the pod and having a rotor and a stator, and at least one fan in the region of the pod. The fan may be adapted to blow air out of a rear part of the pod, through an air gap between the stator and the rotor and into a front part of the pod. A seal structure may be positioned in the pod in such a way that an air flow that bypasses the air gap between the stator and the rotor is substantially prevented.

6 Claims, 9 Drawing Sheets

(56) References Cited

FOREIGN PATENT DOCUMENTS

| | | | |
|---|---|---|---|
| DE | 19636591 | A1 | 3/1998 |
| DE | 10233947 | A1 | 2/2004 |
| EP | 1586769 | A1 * | 10/2005 |
| EP | 1586769 | A2 | 10/2005 |
| ES | 2156706 | A1 | 7/2001 |
| FR | 2797921 | B1 | 9/2001 |
| JP | 54096707 | A * | 7/1979 |
| JP | 58065977 | A | 4/1983 |
| JP | 58127546 | A | 7/1983 |
| WO | 01/06121 | A1 | 1/2001 |

* cited by examiner

WIND TURBINE COMPRISING A GENERATOR COOLING SYSTEM

CROSS-REFERENCE TO RELATED APPLICATIONS

This application is a continuation application of U.S. application Ser. No. 11/662,961 filed Oct. 10, 2007, which is a national stage application filed under 35 U.S.C. §371 of International Application No. PCT/EP2005/010304, accorded an International Filing Date of Sep. 23, 2005, which claims priority to German Application No. 10 2004 046 700.5 filed Sep. 24, 2004. Each of these applications is hereby incorporated herein by reference in its entirety.

BACKGROUND OF THE INVENTION

1. Field of the Invention

The present invention concerns a wind power installation comprising a pylon, a pod mounted rotatably on the pylon, a generator arranged within the pod and having a rotor and a stator, and at least one fan in the region of the pod.

2. Description of the Related Art

Such wind power installations have long been known in the state of the art. There is a large number of design configurations which operate in part with oil cooling, in part with air cooling or also with water cooling. In that respect, all situations involve the problem that losses occur, which also occur in the form of heat and which have to be dissipated. As each component has given thermal stress limits which must be observed, it is therefore necessary to provide adequate cooling in order to be able to dissipate the excess heat and avoid damage due to excessively raised temperatures.

The invention is directed in particular to wind power installations which operate with air cooling. Cooling systems of that kind are known from the wind power installations from Enercon (Types E-40, E-44, E-58 or also E-66). In that case a fan is let into the pod, which draws in cooling air from the exterior and blows it into the interior of the pod so that the cooling air flows through an opening in the generator and in so doing cools the individual components which heat up. The heated air then either generally flows back into a closed cooling circuit or issues outwardly through the air gap between the spinner and the stationary part of the pod.

With the rise in output power of the generators, the cooling requirements of those generators also increases in order to be able to reliably keep the temperatures thereof below critical limits, even in the full load operating condition.

The wind power installations in accordance with the state of the art involve a so-called windward rotor. In other words the pod of the wind power installation is oriented in such a way that the rotor blades are disposed at the side of the pod, which is towards the wind. A fan is arranged on the side remote from the wind (the lee side) in the pod wall. That fan sucks in air from the exterior and conveys it into the pod. There the air flows around the components in the pod and thus provides for heat dissipation and thus a cooling effect.

It will be noted however that in operation of the fan dust, moisture and rain which are also present in the air are also sucked in and transported into the interior of the pod. That results in unwanted fouling of the pod, with the consequence of a faster rate of wear of components (just because of the abrasive effect of dust or sand) and a high level of air humidity in the pod, which is unwanted precisely when the weather is rainy, with all its adverse accompanying phenomena.

BRIEF SUMMARY OF THE INVENTION

Therefore the object of the invention is to reduce the introduction of moisture, sand and other foreign substances into the pod as well as externally perceptible fan noises, and to permit more efficient cooling.

In a wind power installation of the kind set forth in the opening part of this specification that object is attained by arranging the fan within the pod, wherein the fan draws in outside air through a downwardly open air gap, in particular between the pylon and the pod.

In that respect the invention is based on the realization that the air flow along the wind power installation and in particular in the region of the pod has a marked pronounced horizontal component and at best a markedly less pronounced vertical component. In other words the wind and therewith the foreign substances transported thereby flow from the windward side along the pod to the lee side and have then passed the wind power installation. If therefore air is sucked in through a downwardly open air gap, then at most very fine particles can still also be sucked in, which more specifically can be borne upwardly by the air flow, against the effect of the force of gravity. As a result the suction intake of relatively large particles of sand and dust and also the suction intake of raindrops which, as anyone knows, are considerably heavier, is reduced to a high degree, if not entirely prevented.

In order to achieve a suction intake of outside air which is as uniform as possible, distributed over the entire air gap, and to avoid a high suction effect at one or two locations, a preferred development of the invention provides that a plurality of fans are arranged in mutually spaced relationship within the pod.

Particularly preferably there is provided within the pod a platform with fans arranged beneath the platform and with air outlets for the air which has been sucked in, above the platform. In that way it is possible to use the platform for guiding the air flow. At the same time, that arrangement provides beneath the platform a kind of rest space in which the air which has been sucked in can become calm. In that case entrained foreign substances such as particles of dust or sand can also be deposited as a consequence of the force of gravity and are thus further transported in smaller numbers by the fans within the pod.

In a particularly preferred development of the invention the platform is sealed off laterally and downwardly relative to the pod in such a way that the rest of the pod is sealed off in relation to the suction intake region of the fans. By virtue of that arrangement the fans can admittedly transport air which has been drawn in, into the region above the platform, but that sucked-in air cannot flow around the platform and thus pass back to the fans in a flow short-circuit. Rather the air which has been discharged by the fans remains in the remaining part of the pod and can there produce its cooling effect.

In order to achieve particularly effective cooling of the generator, a preferred embodiment of the invention is characterized by sealing off the generator itself and in relation to the pod in such a way that only the air gap between the rotor and the stator of the generator allows a discharge flow of the air which has been sucked in. The air can therefore only flow through the air gap and correspondingly cool the rotor and the stator of the generator with the maximum level of effectiveness.

In order also to be able to advantageously implement that cooling action for the winding heads of the stator winding, a wind power installation according to the invention is preferably characterized by air guide plates which are provided at the entire outer periphery of the rotor and which at a predetermined spacing cover the air gap between the rotor and the stator and extend in the radial direction by a predetermined distance substantially parallel with respect to the stator of the generator.

A particularly preferred development concerns a wind power installation with a lower portion of the pod, which extends a predetermined distance substantially parallel to the pylon and terminates at a lower edge. In order to provide for an intake air flow between the pylon and the pod, which is as uniform as possible and thus also involves a low level of noise, the pod has a lower edge of a ridge-like configuration. That ridge-like configuration substantially prevents turbulence in the air which is sucked in, as occur at a blunt edge, and thus helps to prevent a constriction in the flow passage, caused by the turbulence, and thus an unwanted reduction in the effective cross-section and as a result a markedly excessively small amount of air flowing into the pod, with an excessively slight cooling action which inevitably results therefrom.

In a preferred development of the foregoing embodiment a wind power installation according to the invention is shown with a lower edge which enlarges funnel-like by a predetermined amount. Even without the provision of a ridge that affords a good result as the air flow can cling to the enlarging edge and flow into the pod smoothly, without turbulence and corresponding noise and flow losses.

The invention also concerns a wind power installation comprising a pylon and a pod which is mounted rotatably on the pylon and which has a generator with a rotor and a stator and at least one fan characterized in that the generator divides the pod into a front part and a rear part which are connected by an air gap between the stator and the rotor, wherein the at least one fan blows air from the rear part of the pod through the air gap into the front part of the pod, wherein sealing means are provided in the pod such that an air flow past the air gap is substantially prevented.

In that respect the invention is based on the realization that the cooling air must be fed more efficiency than hitherto to the generator or the parts thereof which heat up. For that purpose the invention provides that if possible all the cooling air but at least by far the major part of the cooling air flows through the air gap between the installation rotor and the generator and otherwise substantially all other openings in the rotor or stator of the generator are closed in order thus to compel the cooling air which is sucked in by fans or other fan systems to take the flow path through the air gap.

In that respect the invention is not only suitable for original equipment on new wind power installations but also for retrofitment to existing wind power installations.

In that respect the invention makes it possible to increase the generator power even in the case of an existing wind power installation and thus improve the overall efficiency of the installation, in which respect the measures for implementing the invention are comparatively slight and permits a sustained improvement in cooling and thus also a reduction in the total thermal stress on the installation.

Further configurations of the invention are the subject-matter of the appendant claims.

BRIEF DESCRIPTION OF THE SEVERAL VIEWS OF THE DRAWINGS

An embodiment by way of example is described in greater detail hereinafter with reference to the Figures in which.

DETAILED DESCRIPTION OF THE INVENTION

Figure 1:
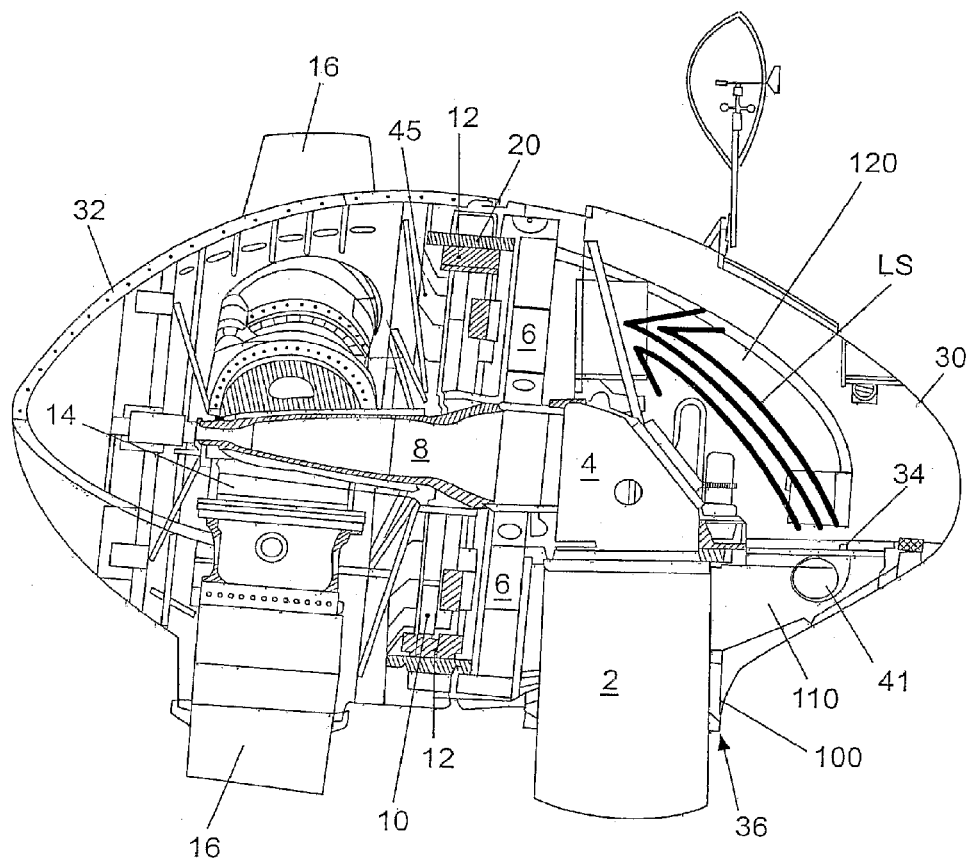
FIG. 1 shows a partial side view and partial cross-section of the pod of a wind power installation.

FIG. 1 shows a side view of a pod of a wind power installation according to the invention. In FIG. 1, shown on a pylon head 2 is a machine carrier 4 to which a stator carrier 6 and a journal 8 are in turn mounted. A hub 14 with the rotor blades 16 fixed thereto and a pole rotor 10 of the generator are arranged rotatably about the journal 8.

The stator 20 of the generator is carried by the stator carrier 6 while the pole rotor 10 (rotor) with pole windings and pole pieces 12 rotates within the generator together with the hub 14 on the journal 8. The structure on the pylon head 2 is enclosed by a pod 30, 32 which comprises a pod fairing 30 and a hub fairing 32. While the hub fairing 32 rotates with the hub 14 the pod fairing 30 encloses the stationary part of the pod. It will be appreciated in that respect that 'stationary' only denotes the rotary movement caused by the wind and transmitted by way of the rotor blades 16 to the hub 14 and the generator. In that respect wind direction tracking is initially disregarded at this point.

Disposed in the rear part of the pod which is faired by the pod fairing 30 is a pod platform 34 which can be walked upon. A fan 41 is shown beneath that pod platform 34. The fan 41 sucks in air through an air gap 36 between the pylon head 2 and the downwardly open end of the pod fairing 3. As the outlet of the fan 41 is at the top side of the pod platform 34 the air flow LS which is sucked in by the fan will issue above the pod platform 34 and is then deflected towards the generator by the pod fairing 30. As a result there is a directed air flow LS towards the generator and naturally also through the openings of the generator. That air flow LS dissipates heat in that situation and thus cools the generator.

As the pod fairing 30 has a lower portion 100 with a downwardly open gap 36 through which the air is sucked in by the fan 41, at best relatively small suspended particles are also sucked in with the air and heavier particles such as dust or grains of sand and raindrops or hailstones remain very substantially outside the pod.

In the region of the hub fairing 32 and between the generator and the hub 14 it is possible to see air guide plates 45 which divert the air LS flowing through the generator in the direction of the outer generator periphery so that the winding heads 22 of the winding of the stator 20, which are disposed there in the air flow LS, are specifically and targetedly disposed in the flow path of the outflowing air and therefore can be equally specifically and targetedly cooled. The air can then issue through an air gap between the pod fairing 30 and the hub fairing 32 so that fresh air can always be subsequently supplied by the fan 41.

Figure 2:
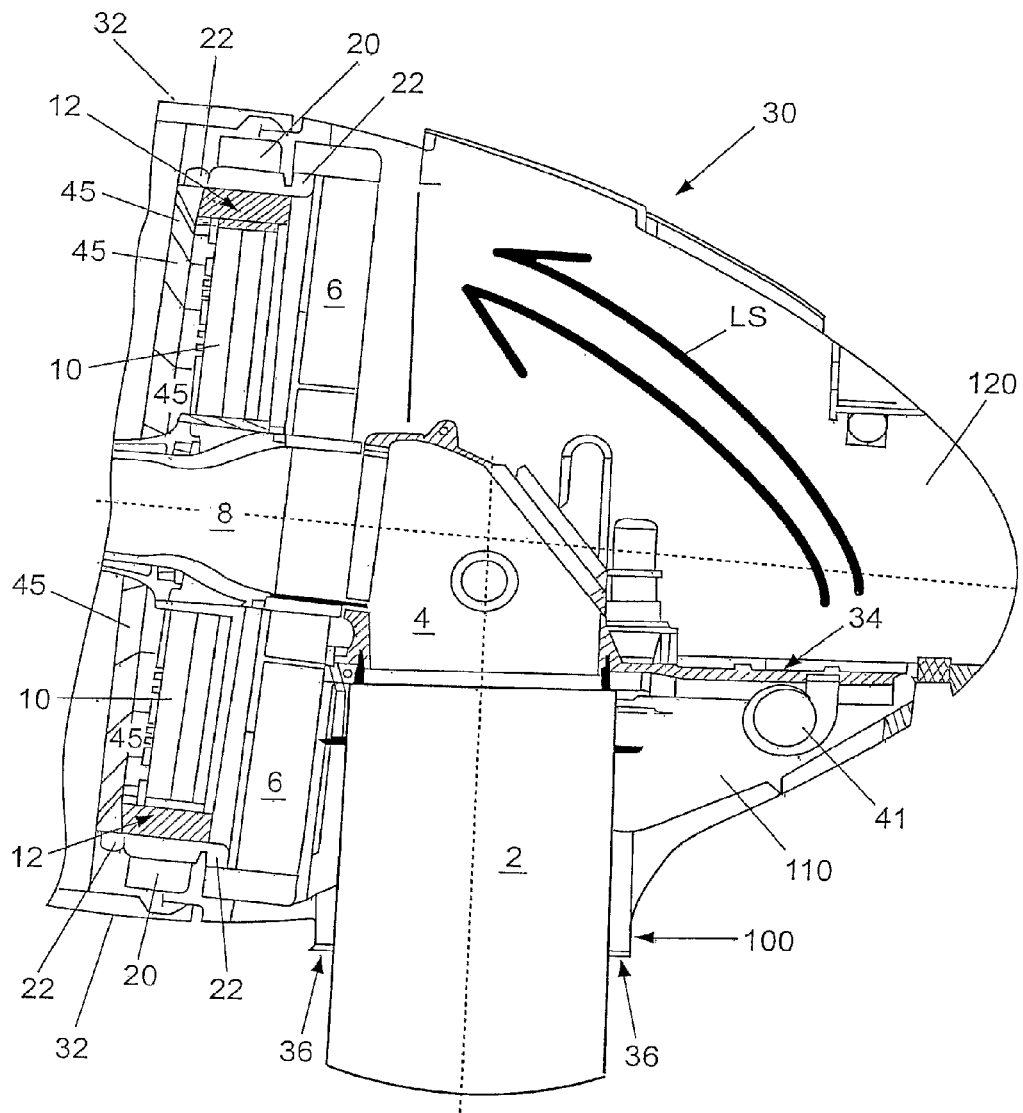
FIG. 2 shows a simplified partial view on an enlarged scale of the pod shown in FIG. 1.

FIG. 2 shows a simplified view on an enlarged scale of a part of the pod of the wind power installation, shown in FIG. 1. In FIG. 2, it is possible clearly to see once again the machine carrier 4 arranged on the pylon head 2 and the journal 8 which is once again mounted thereto and the stator carrier 6. The stator 20 of the generator with the stator winding and the winding heads 22 is mounted to the stator carrier 6. The pole wheel 10 of the generator with the pole windings and pole pieces 12 is supported rotatably about the journal 8. Air guide plates 45 are arranged at the side of the pole wheel 10, which is towards the hub (not shown in this Figure). The air guide plates 45 extend over the entire periphery of the pole wheel and are curved away radially outwardly in such a fashion that they extend a predetermined distance substantially parallel to the stator 20 and the stator winding with the pole heads 22. Once again the pod platform 34 with the fan 41 which is arranged therebeneath and the air outlet of which is above the pod platform 34 can be clearly seen in the region of the pod fairing 30. The fan 41 sucks in outside air through the air gap 36. That air gap 36 is disposed between the pylon head 2 and the downwardly open lower portion 40 of the pod fairing 30. In this respect it can be clearly seen from FIG. 2 that the lower edge 100 of the pod fairing opens outwardly in a funnel shape by a predetermined amount. By virtue of that arrangement, the air flow can be better applied against the inside wall of that region of the pod fairing 30 and can flow into the pod without involving turbulence. As a result the entire cross-section of the air gap 36 can be used as an effective suction intake area which is also not reduced or impaired by turbulence.

The air which is sucked in through the air gap 36 can be calmed somewhat in the space 110 beneath the pod platform 34 due to the larger cross-section and the reduction in the flow speed, that this entails, before it is transported by the fan 41 to the top side 120 of the pod platform 34. The air which issues at the top side 120 of the pod platform 34 is again passed by the pod fairing 30 in the direction of the generator 6, 10, 12, 20, 22, flows through the generator and in that way can dissipate heat and thus cool the generator.

After the air has flowed through the generator it is also targetedly passed by the air guide plates 45 over the winding heads 22 before it issues through an air gap between the pod fairing 30 and the hub fairing 32 and thus carries the heat away.

Figure 3:
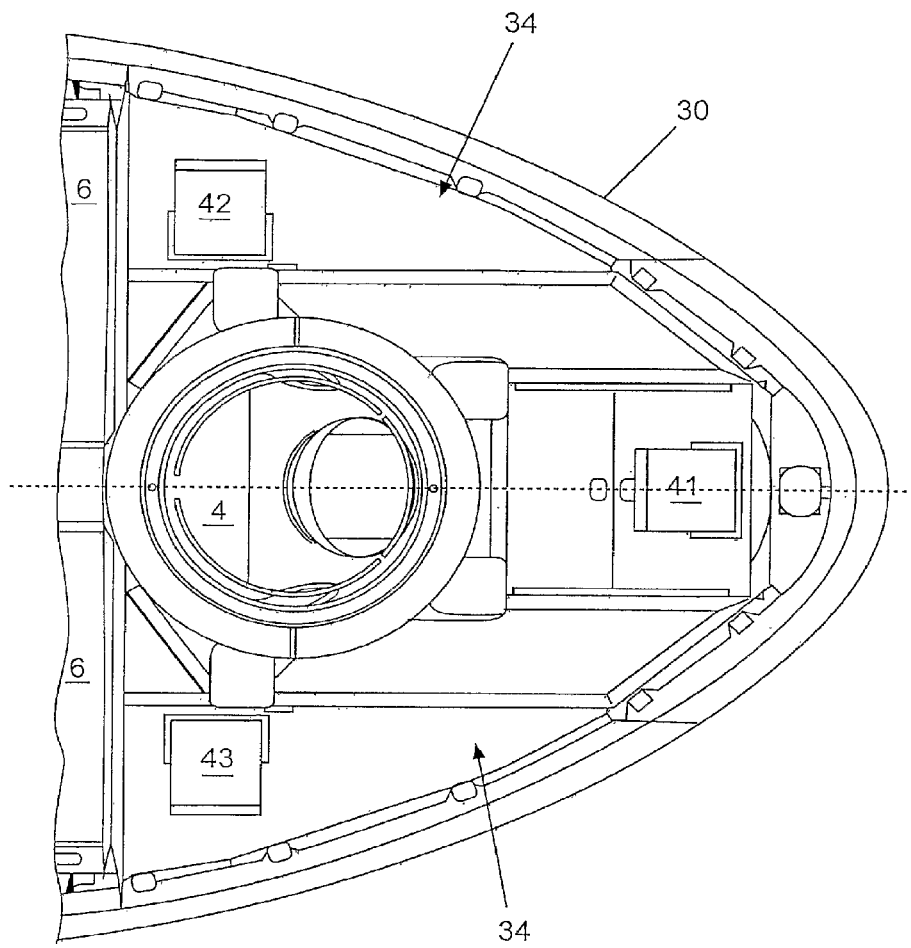
FIG. 3 shows a plan view of the platform in the interior of the pod.

FIG. 3 shows a plan view on to the rear part of the pod. It is possible to clearly see from this Figure the machine carrier 4 on which the stator carrier 6 of the generator is arranged. In this Figure the pod platform 34 surrounds the machine carrier 4 and it is possible to see in the pod platform 34 three fans 41, 42 and 43 or, as this in fact involves a plan view, their air outlets. It will be clear therefrom that the required air flow LS for cooling the generator can be produced not just by a single fan but also by a plurality of fans.

A further aspect of the invention is that of sealing off the pod platform 34 with respect to the pod fairing 30. A great deal of care is to be used in relation to that sealing effect in order to prevent a flow short-circuit. Such a flow short-circuit would occur if the air conveyed by the fans 41, 42, 43 into the space above the pod platform 34 could flow around the pod platform 34 due to leaks between the pod platform 34 and the pod fairing 30 and could thus pass into the suction intake region of the fans 41, 42, 43 again. More specifically, the consequence of this would be that the amount of air flowing around the pod platform 34 would not flow away in the direction of the generator and would thus not be available for cooling.

Figure 4:
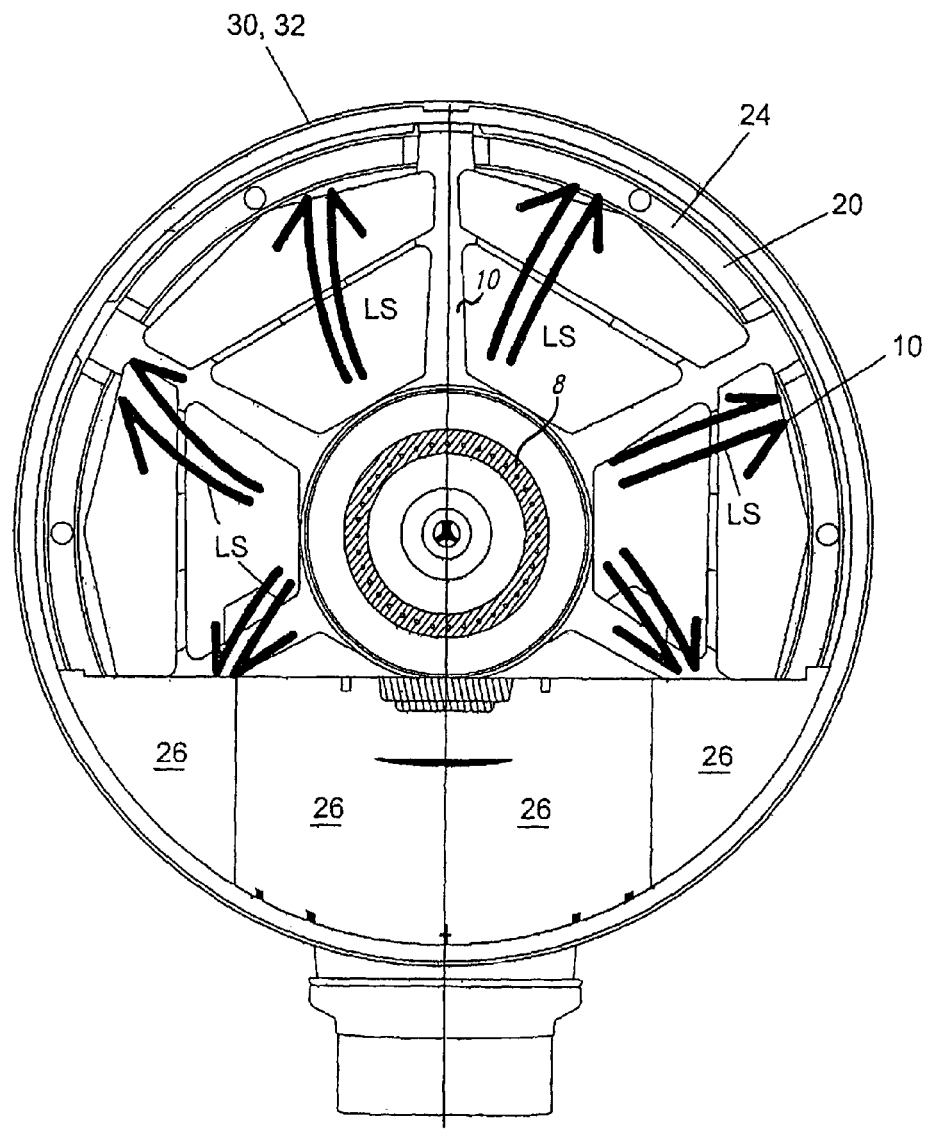
FIG. 4 shows a front view of the interior of the pod, looking on to the generator.

Further sealing measures are provided for still further increasing the effectiveness of cooling of the generator by the air flow. Those measures can be seen from FIG. 4. This Figure is a front view of the generator from the direction of the pod platform which however is not shown in this Figure.

The journal 8 can be clearly seen in the middle region. The pole wheel 10 of the generator is arranged rotatably about that journal 8. The pole wheel 10 rotates within the stator 20, while a generator air gap 24 is provided between the pole wheel 10 and the stator 20.

In order to produce a cooling action which is as effective as possible the air should flow exclusively through the generator air gap 24. For that reason the pole wheel 10 is sealed off in itself in such a way that no air flows therethrough. In addition the stator 20 is also sealed off in relation to the pod fairing 30. Accordingly only the path through the generator air gap 24 remains for the air flow LS. The best action is achieved in that fashion.

Cover plates 26 are provided in order also to avoid a flow short-circuit at the side, towards the generator, of the pod platform (not shown in this Figure). The cover plates 26 are disposed in directly adjoining relationship beneath the pod platform (not shown) and seal off the suction intake region in relation to the remainder of the pod, or vice-versa. In that way the air is passed to the generator within the pod and above the pod platform and can also flow out of the viewing plane of this Figure behind the cover plates 26 through the part of the generator air gap 24 which is to be found there. For that purpose the cover plates 26 are spaced at a predetermined distance from the generator to permit that air flow.

By virtue of that arrangement all the air delivered by the fans flows through the generator air gap 24 and thus carries away the maximum amount of heat.

Figure 5:
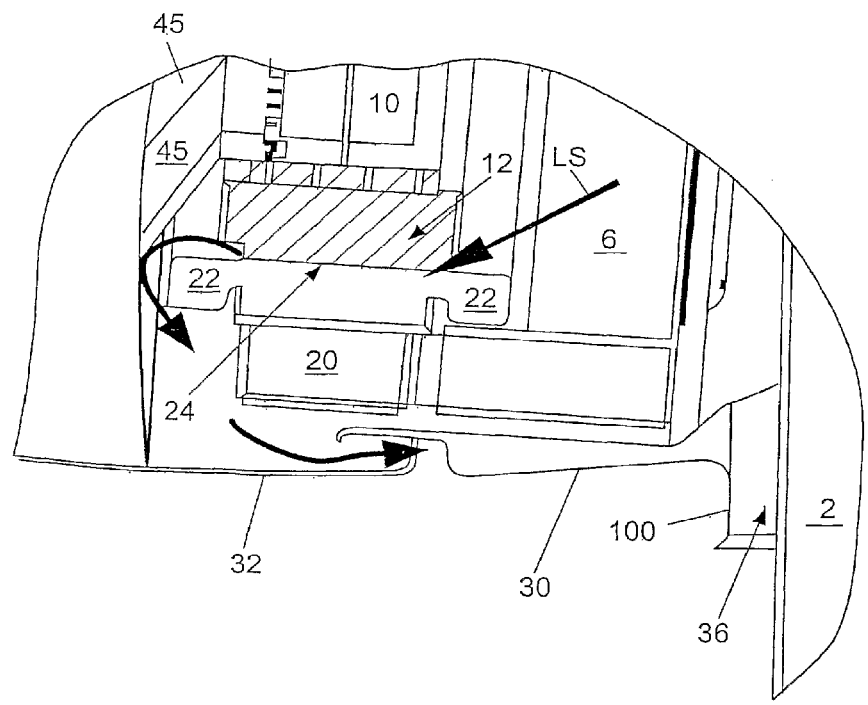
FIG. 5 shows a simplified detail view on an enlarged scale of a part of the generator.

FIG. 5 shows on a further enlarged scale a region of the generator, and the flow path followed by the air LS in that region. The right-hand part of this Figure shows the pylon 2 and the air gap 36 which is formed between the pylon 2 and the downwardly open edge, which enlarges in a funnel configuration, of the pod fairing, the air gap 36 also being referred to as the azimuth gap. Suction intake of the air and discharge into the interior of the pod as well as the way in which the air is guided towards the generator is described by the description relating to FIGS. 1 to 4, while it can be seen from this Figure that the air flow through the generator air gap 24 flows through between the pole pieces 12 arranged on the pole wheel 10 and the stator winding with the winding heads 22, which is mounted to the stator 20 which is held by the stator carrier 6. After the air flow has passed that generator air gap 24 it encounters the air guide plates 45 arranged on the pole wheel 10 and is deflected thereby in such a way that it targetedly flows around the winding head 22 at the left in the Figure and thus also reliably carries away the heat there. Thereafter the air flow flows into the open air again through an air gap between the hub fairing 32 and the pod fairing 30.

Figure 6:
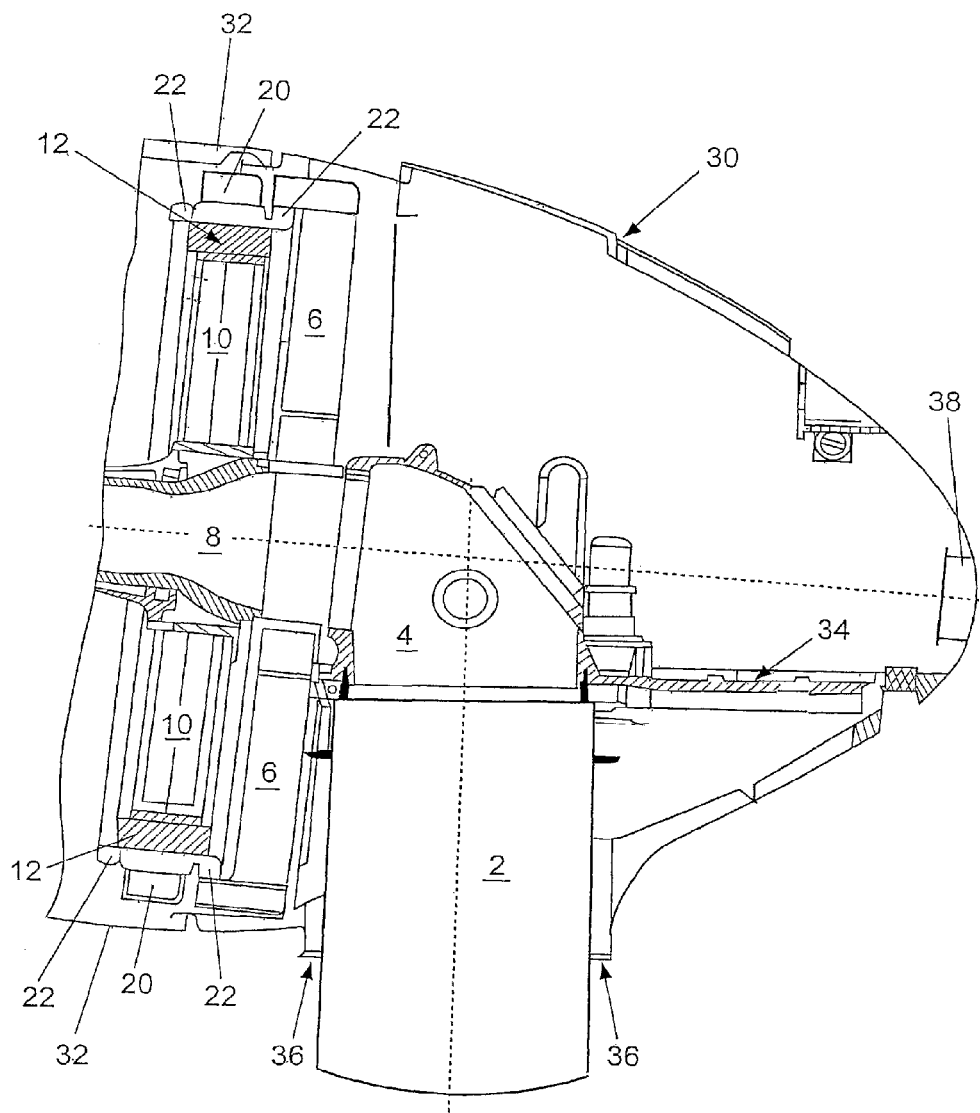
FIG. 6 shows a partial side view of a wind power installation in accordance with a further embodiment.

FIG. 6 shows a partial view of a wind power installation in accordance with a further embodiment. In contrast to the wind power installations shown in FIGS. 1 to 5 this wind power installation has a fan 38 at one end of the pod 30. That fan 38 serves to produce an air flow within the pod in order to cool the pod and other parts which heat up. As described hereinbefore in this case the rotor 10 and the stator 20 of the generator are sealed off in such a way that the air flow produced by the fan 38 can move only through the air gap between the rotor and the stator 10, 20 from the rear part of the pod to the front part thereof and can thus contribute to cooling the generator. In other words, cooling of the generator is effected as in the above-described embodiments, but a fan 38 at the outside of the pod 30 is used in order to supply fresh air.

In accordance with the invention the fan systems are fitted into a pod platform and blow the air which is sucked in upwardly into the region of the pod which directly adjoins the rear part of the generator (viewed from the rotor side). In that case the air which is sucked in must either be sucked in from the pylon itself or preferably from the pylon gap, that is to say the gap between the machine carrier and the pylon at which the azimuth bearing is also disposed in order to position the installation at a desired angle relative to the wind.

In this case the suction space is sealed off in the generator direction forwardly also, for example with plates, and the gap between the pod platform and the pod housing (of glass fiber-reinforced plastic) is also closed for example with a plate.

On the spinner side of the pod air guide plates guide the cooling air which passes through the air gap past the winding head of the stator and the air which is heated in that way can issue outwardly directly through the air gap between the spinner and the pod.

All openings in the rotor are in this case preferably completely closed, which applies not only in respect of simple bores but also in respect of the manhole, that is to say the opening provided so that if necessary a service engineer can pass into the spinner from the rear part of the pod in order to carry out maintenance operations in the spinner. That manhole can be closed for example by a tarpaulin which in a repair situation can be easily removed or opened. After the maintenance operations the manhole can be air-tightly closed again with that tarpaulin.

The pod usually surrounds the stator ring of the stator and in accordance with the invention it is also provided that any gap between the pod and the stator ring is air-tightly closed by a seal.

The consequence of the invention is not only that an existing generator can be better put to use but also that considerably less electrical fan power is necessary to provide an adequate cooling effect.

If it is just imagined that, in a wind power installation of type Enercon E-48, the generator air gap is approximately of a cross-sectional area of 0.5 m² and that otherwise any other holes in the rotor involve a cross-sectional area of 0.1 m², that then already reduces the fan efficiency by at least 20%.

As an alternative to the above-described air gap between the pylon and the lower portion 100 of the pod openings can also be provided in the lower portion of the pod. Such openings can be for example gratings, slits or the like. Alternatively or in addition thereto, there can be a scoop which is directed towards the lee side or openings directed towards the lee side in the pod in order to rearwardly suck in the air flowing therepast.

Figure 7:
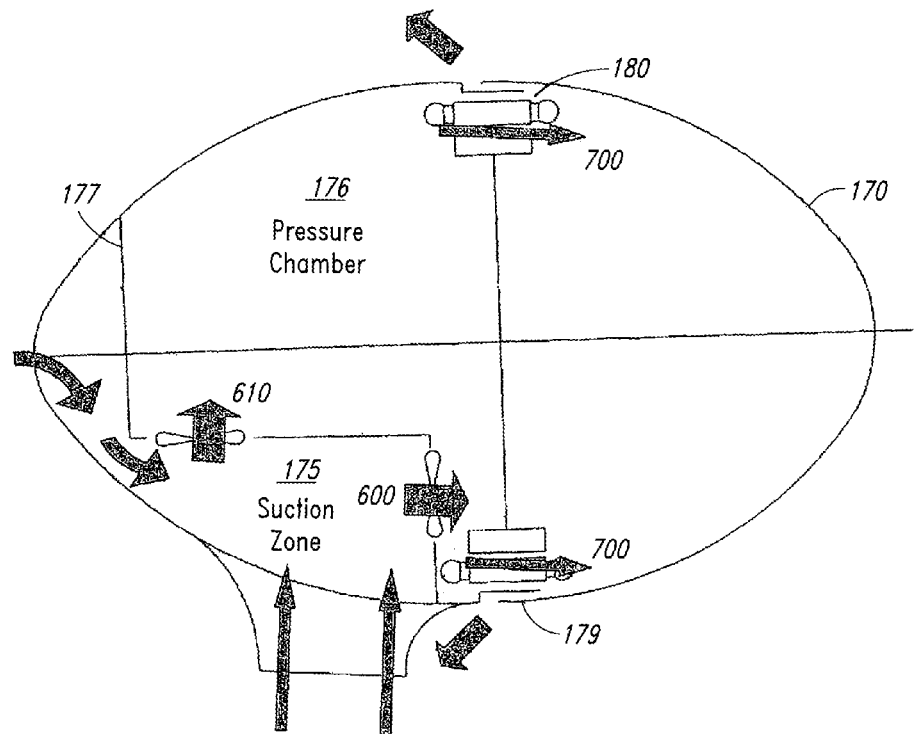
FIG. 7 shows a diagrammatic cross-section through a pod of the wind power installation in accordance with a further embodiment.

FIG. 7 shows a diagrammatic cross-section through a pod of the wind power installation in accordance with a further embodiment. The pod 170 has a generator 180, a pressure space 176 and a suction space 175 which are separated from each other by a wall or a platform 177. The wall 177 is preferably of a substantially air-tight nature and is carefully sealed off in relation to the pod. Provided in the partition 177 are two fans 600, 610 wherein one of the two fans 600, 610 is oriented horizontally and the second fan 610 is oriented vertically. Preferably the vertically oriented fan is arranged in such a way that the air which is drawn in is blown into the region of the air gap of the generator 180. The second fan 610 blows the air from the suction space 175 through the generator air gap in the form of an air flow 700 into a region behind the generator 180. Thus air is sucked into the suction space 175 through a pylon gap or at the tail of the pod, and the air is blown from the suction space 175 into the pressure space 176 by the fans 600, 610. As there is a certain overpressure in the pressure space 176, the air escapes through the air gap of the generator 180 and in so doing correspondingly cools the generator. The air then issues from a hood air gap 179 on the pod 170.

The air flow 700 through the generator air gap is assisted by the first, horizontally oriented fan 600. Both the first and also the second fans 600, 610 can each be implemented by one or more fans.

In regard to the design of the internal space of the pod and the sealing wall 177 it is important for those elements to be sealed in relation to the pod as leakage points reduce the fan efficiency and thus the generator cooling effect.

Figure 8:
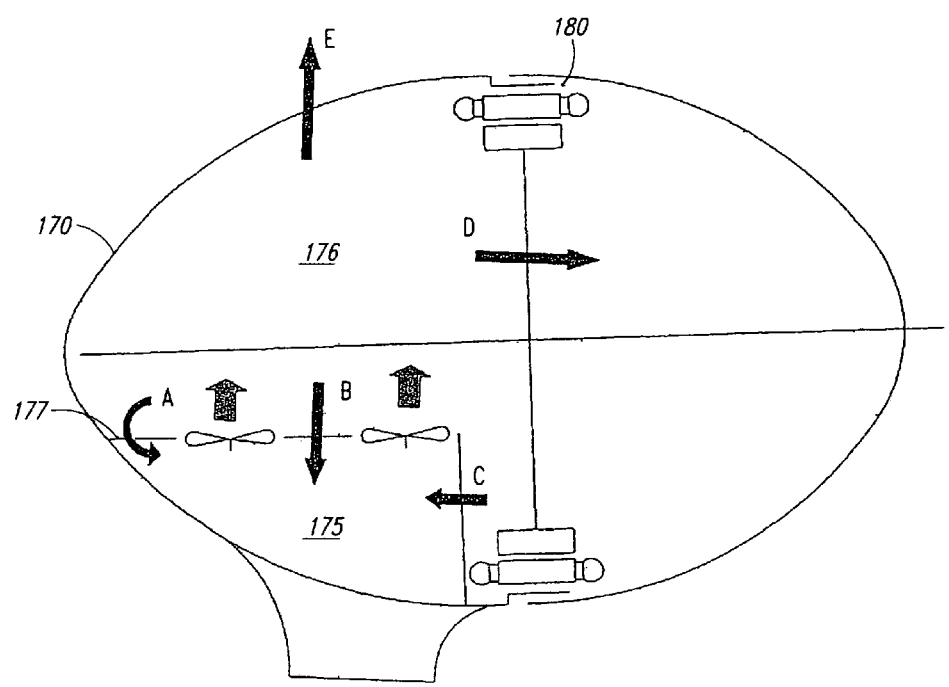
FIG. 8 shows a diagrammatic cross-section through a pod of a wind power installation in accordance with a further embodiment of the invention.

FIG. 8 shows a diagrammatic cross-section of a pod of a wind power installation in accordance with a further embodiment of the invention. FIG. 8 shows in particular those locations at which possible leaks can occur. A first leak A can occur for example between the platform 177 and the hood 170 of the pod. Further leaks B can occur between the platform 177 and a machine carrier of the pod, in particular through cable holes in the platform 177. Furthermore leaks C can occur between the front wall of the boundary means between the suction space and the pressure space as well as the hood of the pod 170. A further leak D can occur through holes in the rotor of the generator of the wind power installation. A further leak E can occur through the hood hatch. Finally a further leak can also occur through cable holes in the machine carrier.

All the above-mentioned possible leaks must be sealed off by suitable measures in order to achieve the best possible cooling effect for the generator.

The provision of a platform with a front wall and optionally a further wall which is disposed parallel to the tail of the pod provides that the interior of the pod can be divided into a pressure space and a suction space.

Figure 9:
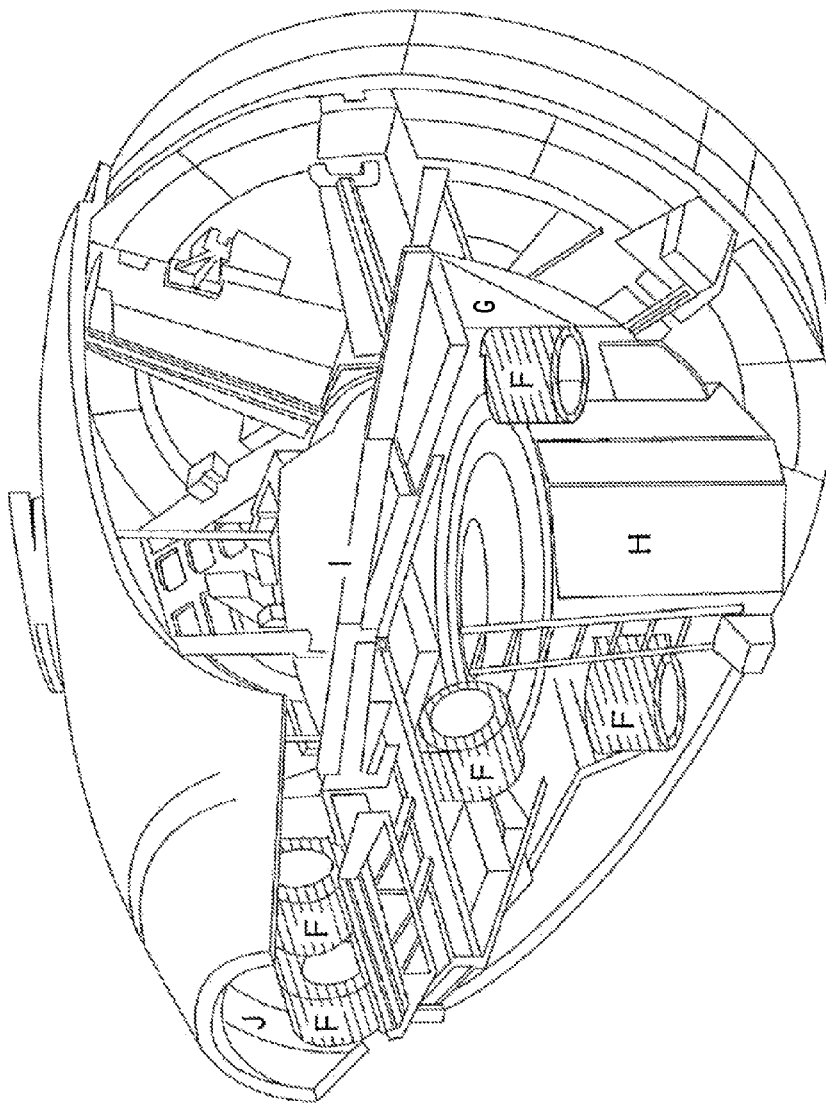
FIG. 9 shows a perspective partial section of a pod in accordance with a further embodiment of the invention.

FIG. 9 shows a perspective partial sectional view of a pod in accordance with a further embodiment of the invention. Pod plates G and a pod tarpaulin H are arranged beneath the platform of the pod. In this arrangement the edges of the plates and the tarpaulin with sealing plates I are sealed off in relation to the outside wall of the pod. At the tail of the pod a platform tarpaulin J separates the suction space from the pressure space. Shown here are five fans F which draw in air through the pylon gap and/or through the tail hole and blow the air upwardly and forwardly. Such a design configuration for the fans and the pod is advantageous as less noise reaches the exterior and less rain or dust is sucked or blown into the installation. In addition it is possible to install more powerful fans and the fans can be subsequently replaced.

In accordance with a further embodiment of the invention a plurality of fans are arranged distributed at the periphery of the generator to blow air through the air gap of the generator. The number of fans can be redundantly established so that, if one of the fans fails, the other fans can blow an adequate amount of air through the air gap of the generator to maintain the cooling effect. Alternatively or in addition thereto the power of the fans can be redundantly established so that the fans can at least temporarily replace a failed fan. In that respect the fans are preferably arranged distributed at the periphery of the generator in the proximity of the air gap.

In this case the pressure space is of such a configuration that there is an overpressure so that one of the fans can even fail and nonetheless air can flow through the air gap of the generator by virtue of the pressure difference between the pressure space and the region in front of the generator. As already stated hereinbefore suitable sealing of the pressure space is necessary.

In accordance with a further embodiment air gratings can be arranged over the in particular horizontally oriented fans in order thereby to prevent objects from being able to fall into the fans. Alternatively or in addition thereto it is possible to provide on the air gratings a mat which prevents objects from falling into the fans. In that case the mat is preferably only fixed at one of its ends so that in operation of the fan the mat is moved upwardly by the air flow generated by the fan and, as soon as the fan is shut down, it drops on to the air grating again. That therefore ensures that the fans are also protected from small objects while operation of the fans is not seriously disturbed.

The air flow can be shortened by the perpendicularly oriented fan 600 shown in FIG. 7 and directed directly or into the proximity of the air gap of the generator. That thus permits an air flow both upwardly and also forwardly. The air required for that purpose is used through the pylon gap and a hole in the tail.

Typically the generator air gap is of a cross-sectional area of 0.5 m². If however for example a single cable passage remains open in the platform (0.1 m²), then the cooling efficiency is reduced by about 20%.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation comprising:
   a pylon;
   a pod mounted rotatably on the pylon, the pod having a front interior portion and a rear interior portion;
   a generator arranged within the pod between the front interior portion and the rear interior portion, the generator including a rotor and a stator and having an air gap between the rotor and the stator;
   at least one fan coupled to the pod, the fan being arranged to draw outside air into the rear interior portion of the pod from an external environment and force the outside air through the air gap between the rotor and the stator into the front interior portion of the pod; and
   seal structures positioned in the pod to substantially prevent air flow from bypassing the air gap between the rotor and the stator when the outside air is forced from the rear interior portion to the front interior portion, and
   wherein the at least one fan and the stator are sealed off in relation to the pod in such a way that substantially only one second air gap remains open between the rotor and the stator of the generator and permits a discharge flow of the outside air which is drawn in.

2. The wind power installation according to claim 1, further comprising:
   air guide plates positioned at an outer periphery of the rotor and which at a predetermined spacing cover over the second air gap between the rotor and the stator and extend in a radial direction a determined distance parallel to the stator of the generator.

3. A wind power installation comprising:
   a pylon;
   a pod mounted rotatably on the pylon;
   a generator with a rotor and a stator, the generator dividing the pod into a front part and a rear part which are connected by an air gap between the stator and the rotor;
   a plurality of fans in the rear part of the pod, the plurality of fans adapted to draw outside air into the rear part of the pod from an external environment and force the outside air out of the rear part of the pod, through the air gap, into the front part of the pod, and out of the pod into the external environment;
   seal structures positioned in the pod to substantially prevent air flow from bypassing the air gap;
   a first partition positioned in the rear part of the pod which divides the rear part of the pod into a first part and a second part, at least one of the plurality of fans provided in the second part of the rear part of the pod and adapted to force outside air drawn into the pod through the partition into the first part of the rear part of the pod; and
   a second partition adjoining the first partition in such a way that it extends parallel to the generator, at least one of the plurality of fans arranged in the second partition in such a way that the outside air which is drawn by that fan is directed into the proximity of the air gap of the generator.

4. The wind power installation according to claim 3, further comprising:
   air flow guide elements in the front part of the pod which guide the outside air passing through the air gap past winding heads of the stator.

5. The wind power installation according to claim 3 wherein the rotor of the generator has a selectively closable passage.

6. The wind power installation according to claim 3 wherein the at least one fan draws in outside air through an air gap between the pylon and the pod.

* * * * *